(12) United States Patent
Manzer

(10) Patent No.: US 7,511,913 B2
(45) Date of Patent: Mar. 31, 2009

(54) STABLE TIME DOMAIN RADIAL SELF-SERVO WRITE PROPAGATION

(75) Inventor: Dennis G. Manzer, Bedford Hills, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 286 days.

(21) Appl. No.: 11/409,335

(22) Filed: Apr. 20, 2006

(65) Prior Publication Data

US 2007/0247737 A1    Oct. 25, 2007

(51) Int. Cl.
  *G11B 21/02* (2006.01)
(52) U.S. Cl. ........................................................ 360/75
(58) Field of Classification Search ................... None
  See application file for complete search history.

(56) References Cited

U.S. PATENT DOCUMENTS

| | | | |
|---|---|---|---|
| 5,907,447 A | 5/1999 | Yarmchuk et al. | |
| 6,785,087 B2 * | 8/2004 | Saito | 360/78.09 |
| 6,819,518 B1 * | 11/2004 | Melkote et al. | 360/75 |
| 6,847,503 B2 * | 1/2005 | Zhang et al. | 360/78.09 |
| 6,922,596 B2 * | 7/2005 | Erickson et al. | 360/75 |
| 6,924,960 B1 * | 8/2005 | Melkote et al. | 360/77.06 |
| 6,924,961 B1 * | 8/2005 | Melkote et al. | 360/78.09 |
| 6,950,271 B2 * | 9/2005 | Inaji et al. | 360/78.09 |
| 6,963,465 B1 * | 11/2005 | Melkote et al. | 360/75 |
| 6,999,263 B1 * | 2/2006 | Melkote et al. | 360/75 |
| 6,999,267 B1 * | 2/2006 | Melkote et al. | 360/77.04 |
| 7,031,095 B2 * | 4/2006 | Kim et al. | 360/78.09 |
| 7,046,472 B1 * | 5/2006 | Melkote et al. | 360/75 |
| 7,203,028 B2 * | 4/2007 | Chung et al. | 360/78.09 |
| 7,286,316 B2 * | 10/2007 | Sai et al. | 360/75 |
| 7,330,331 B2 * | 2/2008 | Zhang | 360/75 |
| 2006/0187571 A1 * | 8/2006 | Kim et al. | 360/78.09 |

* cited by examiner

*Primary Examiner*—Hoa T Nguyen
*Assistant Examiner*—James L Habermehl
(74) *Attorney, Agent, or Firm*—Townsend and Townsend and Crew LLP; Patrick Duncan

(57) ABSTRACT

Embodiments of the present invention provide an approach in the time domain, instead of the frequency domain, for analyzing and correcting for radial propagation instability in servo-writing. In one embodiment, a system for controlling a read/write head of a disk drive to correct propagation errors during self-servo writing on a disk comprises a time-domain based controller to provide closed-loop feedback control to an actuator for moving the read/write head, the controller including a state observer. The controller is configured to measure read head position information of the read/write head on the disk; provide the measured read head position information to the state observer which produces feedback variables for feedback control of the read/write head, the feedback variables being weighted by feedback gains which have been determined a prior; and apply the weighted feedback variables to provide the closed-loop feedback control to the actuator for moving the read/write head.

18 Claims, 16 Drawing Sheets

STABLE TIME DOMAIN RADIAL SELF-SERVO WRITE PROPAGATION

CROSS-REFERENCES TO RELATED APPLICATIONS

NOT APPLICABLE

BACKGROUND OF THE INVENTION

This invention relates generally to hard disk drive memory storage devices and, more particularly, to a time domain solution to self-servo writing disk files.

Conventional hard disk manufacturing techniques include writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of microminiaturization, traditional servowriting methods are inadequate. Other benefits of self-servo writing are disclosed, for example, in U.S. Pat. No. 5,907,447.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be between a few to several hundred, or even more, sectors per track, that same number of servo data areas must be dispersed around a data track. These servo-data areas allow a head to follow a track center line around a disk, even when the track is out of round, as can occur with spindle wobble, disk slip and/or thermal expansion. As technology advances provide smaller disk drives, and increased track densities, the placement of servo data must also be proportionately more accurate.

Servo-data are conventionally written by dedicated, external servowriting equipment, and typically involve the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disk and heads will be exposed to the environment to allow the access of the external head and actuator.

FIG. 1 shows a self-servo writer machine in which servo patterns are written from the inner diameter (ID) to the outer diameter (OD), i.e., one track at a time. FIG. 1 shows a series of points in time as the disk rotates at one servotrack position over servo data in subsequent propagation burst sectors. Sectors are defined herein as a group of radial propagation bursts from which a single position measurement is obtained on each disk rotation at each sector. At time T0, a section of the disk drive 400 is shown of the disk surface A with the write head 403 positioned to write another propagation radial servo burst at 406 in this sector as the disk rotates. The direction of track motion is horizontal in the illustration. The read head 404, offset from the write head by a distance 405, will pass over the previously written radial propagation bursts 412, 413, 414, and 415. In such a configuration, track shape errors can propagate or expand with each track written. Fixing errors is a signal processing problem.

Heretofore errors are treated as repetitive waveforms. For example, U.S. Pat. No. 5,907,447 discloses the use of Fast Fourier Transform (DFT) algorithms to keep self-propagated servopattern track shape errors from growing during the self-servowriting process. Errors in track shape corresponding to frequencies at which the magnitude of the closed loop response exceeds unity will be amplified on subsequent tracks leading to exponential growth of track shape errors. This exponential growth occurs for both systematic (such as write width modulation) and random errors (from TMR (Track Mis-Registration)). Thus, the servo closed loop response corresponds to a step-to-step amplification factor. One solution provided in the '447 patent is to use servo loop parameters that make the magnitude of the closed loop response less than unity at frequencies equal to integer multiples of the rotation frequency. In addition, a feedforward correction is applied to the amplitude burst propagation pattern in order to prevent the propagation servo loops from attempting to follow the track shape error on the next step. The correction may be applied to the amplitude burst propagation pattern simply by modifying the reference amplitude values used by the servo loop before stepping to reflect the position error signal as detected during the write. By pre-compensating the reference amplitudes to account for the known position error during the write, the servo loop will register no error as it follows a smooth trajectory.

As a frequency domain solution, FFT algorithms tend to be complex and difficult to understand. Moreover, such complex algorithms require a significant amount of computational power that often cannot be performed by the HDC (hard disk controller) of a HDD (hard disk drive).

BRIEF SUMMARY OF THE INVENTION

Embodiments of the present invention provide a simpler approach in the time domain, instead of the frequency domain, for analyzing and correcting for radial propagation instability in servo-writing. The time-domain feedback solution falls within the general framework of standard control theory. Thus, very high bandwidth and very high gain control systems can be used, and may significantly reduce TMR (Track Mis-Registration) as compared to the conventional methods. Not only is there no additional computation in the present solution, but the computational burden will be reduced.

The problem of unstable error propagation is stated concisely in a mathematical form. As such, the abstraction removes many of the practical details of a disk drive. For example, no requirements are made that the disk file get its position from a multi-burst servo pattern. It suffices that position information is read from the disk and written to the disk in some form. The actual number of sectors, how the position information is written, head profiles, rotational speed,or the like, while germane to the implementation, have no bearing on the solution to the error propagation problem. Indeed, much of the disk drive system as embodied previously can be used; only the servo algorithm need be replaced and the prior feedforward correction terms removed.

An aspect of the present invention is directed to a system for controlling a read/write head of a disk drive to correct propagation errors during self-servo writing on a disk. The system comprises a time-domain based controller to provide closed-loop feedback control to an actuator for moving the read/write head; the controller includes a state observer. The controller is configured to, in real time, measure read head position information of the read/write head on the disk; provide the measured read head position information to the state observer which produces feedback variables for feedback control of the read/write head, the feedback variables being weighted by feedback gains which have been determined a prior; and apply the weighted feedback variables to provide the closed-loop feedback control to the actuator for moving the read/write head.

In some embodiments, the state observer could comprise a Kalman filter. The first embodiment discussed here is that the controller is configured to establish a stable control of the read head by any conventional technique. Analysis of any high performance design of such a system shows that the design will yield unstable self-servo write propagation, even though the control loop for holding position is stable. This very same control can be modified by computing the feedback gains for the feedback variables by calculating the closed-loop eigenvalues of the self-servo writing propagation loop. The feedback gains for this loop can be computed to produce a stable propagating loop by scaling the closed-loop eigenvalues by a factor less than 1. This factor is chosen small enough to make the desired closed loop eigenvalues of magnitude less than one. Given this eigenvalue choice, the feedback gains which produce them is uniquely determined mathematically. This choice produces a very small number of non-zero feedback gains which lead to very little computation to achieve the desired closed loop stability of the propagating system. A second approach to determine the feedback gains is to use optimal linear quadratic control criteria. Such a solution has proven to also require a small number of feedback gains, but also allows the designer to introduce performance criteria other than specifying the exact closed loop eigenvalues. Such a criterion is, for example, a propagation loop which produces a small amount of track squeeze.

In accordance with another aspect of the present invention, a self-servo writer for writing to a disk in a disk drive comprises a read/write head; an actuator to move the read/write head; and a time-domain based disk controller configured to provide closed-loop feedback control to the actuator for moving the read/write head. A feature of this invention is to develop a priori a set of feedback controls so that propagation errors during self-servo writing on the disk will not grow. Along with the normal ability to read back head position from the file, the improved controller includes a state observer to provide state feedback for variables which cannot be measured directly. Along with the measured variables, the variables from the observer are weighted by a few feedback gains combined with the position commands to move the read/write head.

Another aspect of the invention is directed to a disk drive having a servo pattern written on a disk by controlling a read/write head of a disk drive to correct propagation errors during self-servo writing on the disk. The read/write head is controlled by a time-domain based controller that provides closed-loop feedback control to an actuator for moving the read/write head. The servo pattern is written on the disk by operating the controller in real time to measure read head position information of the read/write head on the disk; provide the measured read head position information to a state observer which produces feedback variables for feedback control of the read/write head, the feedback variables being weighted by feedback gains which have been determined a prior; and apply the weighted feedback variables to provide the closed-loop feedback control to the actuator for moving the read/write head.

DETAILED DESCRIPTION OF THE INVENTION

The exemplary embodiment of the present invention provides a time-domain approach to analyze and correct for radial propagation instability in self-servo writing (SSW).

As an example, a disk file with 50 sectors is considered, although any arbitrary number can be selected. A small number of sectors is chosen simply to keep the computation required and space to present the output in this example small.

The methodology has been applied to a much larger number of sectors (e.g., 300 sectors) and the results extended to large offsets. Offset is the number of tracks between the read sensor and the write element of the head. In this example, the sample period is 0.001 second which implies that the disk rotates at 1200 rpm, and the voice coil motor (VCM) actuator has the following somewhat arbitrary position transfer function, including its control:

$$\frac{100000}{s^2 + 300s + 100000}$$

Figure 1:
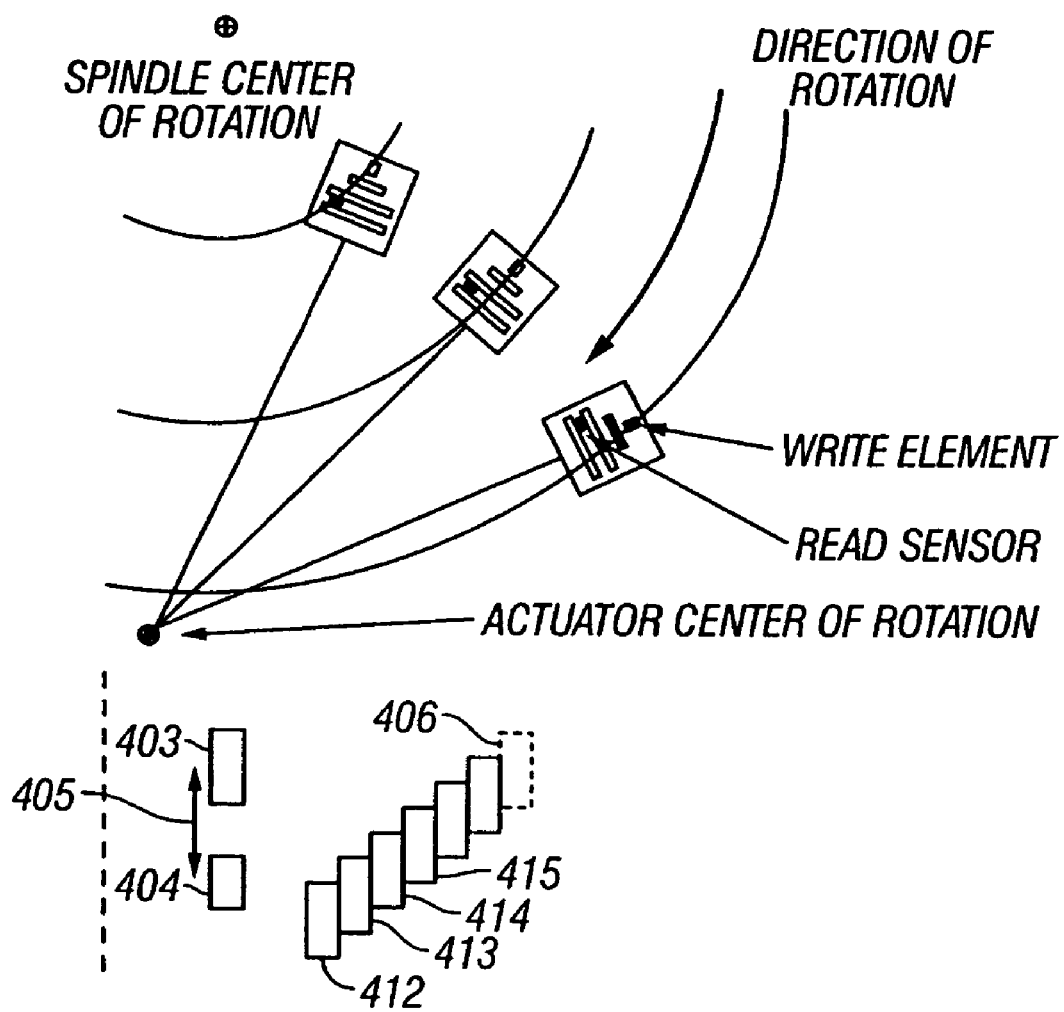
FIG. 1 is schematic diagram of a portion of a self-servo writer machine for writing servo patterns.
Figure 2:
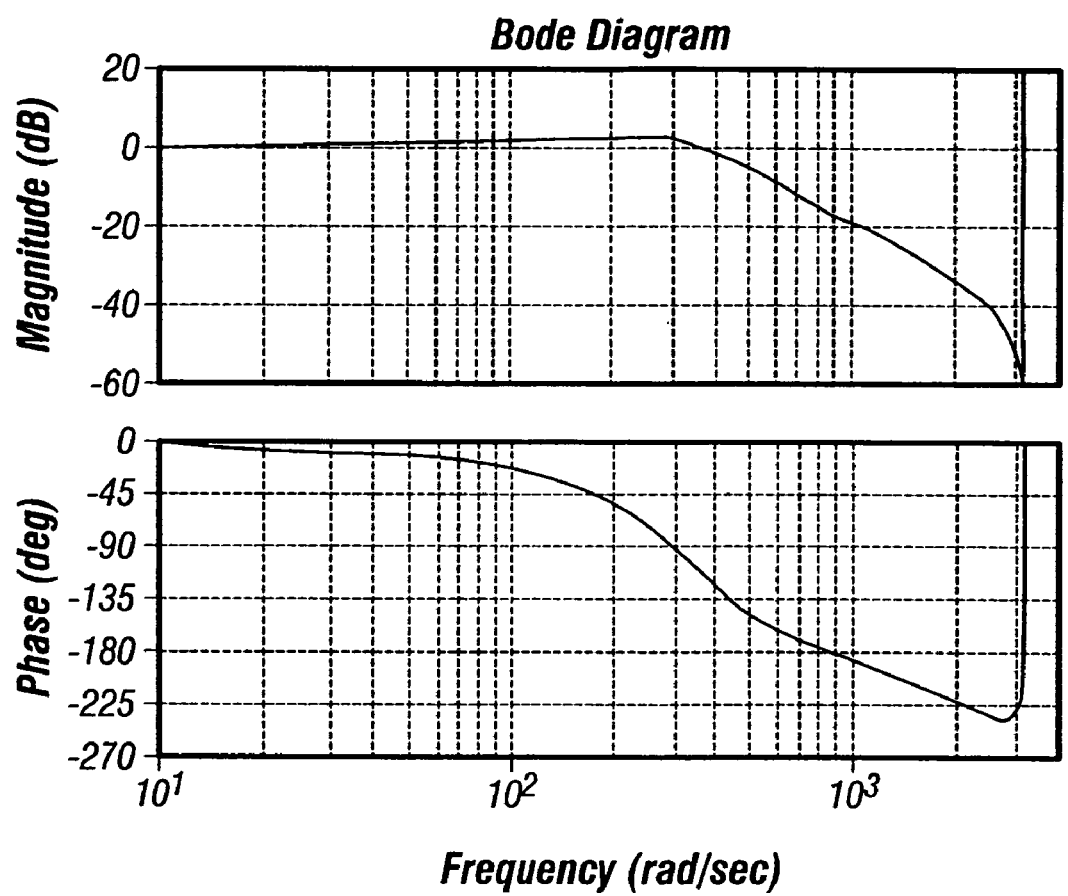
FIG. 2 is a Bode diagram showing magnitude and phase versus frequency in an example for a self-servo write positioning loop.

This has a largely second order response. Its discrete time version is $$\frac{0.04498z + 0.04069}{z^2 - 1.655z + 0.7408}$$

given in the Z transform, which has a Bode plot shown in FIG. 2. The transfer function has a closed loop magnitude larger than 1. It is unremarkable as a typical second order sampled data system.

In the following simple simulation experiment, it is assumed that a starting position track has been written in the file by any start up method. The read and write heads may or may not be offset. For simplicity, it is assumed that the heads are offset by 1 track. Any offset is in fact allowed. An offset of 1 may not be physically realizable for the multi-burst position measurement case. An offset of 1 is chosen only to show how easily propagation can run into difficulty. Practically, 1 offset might be handled by a single-sided position measurement. Larger offsets will be described later. Offset increases the delay between position information that is written and when it is read. This simple example could as well have been for a 25 sector disk with an offset of 2 tracks, with the rotation speed doubled.

To propagate the next track, the servo must step one propagation track out on the disk (assuming that position bursts have been written so that such information is available to the servo system), and write a new set of position information in the new track. Continuing this process, the head then moves out one more track and writes another set of position information, and so on. To simplify the analysis, the example assumes that position information is written even as the head moves, which is not done in practice. If it were found useful to have such information for the servo, the position information may be stored in computer memory, as if written to the disk. In what follows, "written to the disk" may mean "written to memory." Actual writing of the position information on the disk can take place somewhere within the process, for example, when the motion transients have been completed.

Assuming position information is recorded at every time step, either in memory or actually on the disk, allows a simple set of linear discrete time equations to describe the entire propagation process and exposes the instability. This choice is made only for the simplicity of the modeling and to find the solution. The solution would apply, better in fact, to the case where position information is written to the disk once the step is completed. At every time step, the position servo reads the current position of the head according to the previously written track, computes the servo, and writes a new burst on the disk, encoding its current position. The position read at each instant is 50 times steps old, or one revolution old, for the write head. In order to build a system which attempts radial propagation, one may consider the block diagram illustrated in FIG. 3.

Figure 3:
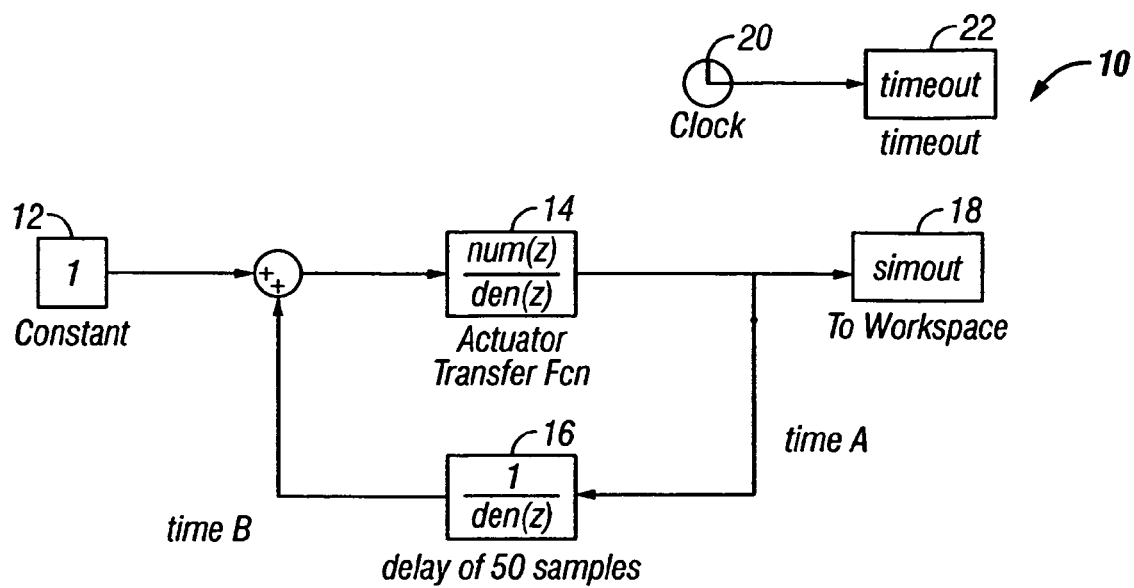
FIG. 3 is a block diagram of a positive feedback system that generates the instability in trying to propagate patterns in SSW (self-servo writing), illustrating an example with 50 sectors and a read/write offset of only one servo track.

FIG. 3 shows a positive feedback system 10, where the position command 12 is a constant 1 and is an input through an actuator transfer function 14 and the value fed back is the position from 50 times steps, or one revolution, prior, as indicated in the delayed feedback block 16. The processed signal is sent to workspace under the simulation out "simout" block 18. A clock 20 is provided to time the control to the timeout block 22. The positive feedback generates the instability in trying to propagate patterns in SSW. The servo designer can choose either time A or time B as the present time. Time A represents the time for the read element, while time B represents the time for the write element after a time delay (which is a delay of 50 samples in the example shown in FIG. 3). Moreover, the servo designer is faced with two choices of how to interpret the system and design a stable solution. Feedback from time point A is the conventional positional servo problem confronted by disk drive engineers, while feedback from time point B is available and needed for servo track writing. Although either time A or time B can be used, it needs to be clear which time reference the system is using. The use of state models and state feedback admits the use of state observer or, in the presence of noise, even Kalman filter designs for optimum performance. State feedback also allows one to tailor "optimal" solutions easily.

Using feedback from time A is computationally less burdensome in performing the calculations. Using time A, a state observer for the actuator system alone can be designed using only two feedback gains to get an observer which asymptotically calculates the states (all 52 of them). A stabilizing control can be developed which has only four gains in the 52 state plant. This is a significant result since it provides a practical solution. It relies on picking the right coordinate system or canonical form for all such servo writing of disks. Without the following exact formulation, the calculations for a large number of sectors with large offsets from read to write head would yield a complex solution involving, for example, nonzero feedback gains for all the states. A plant of order 2 as above, 200 sectors, and an offset of 30 would require 6004 nonzero control servo gains alone. Furthermore, the solution outlined herein shows an insensitivity to offset, i.e., the small number of gains computed are stabilizing for a wide range of offsets.

For the above problem, a typical solution would require 52 gains, the sum of the number of delays, and the order of the plant model. To make the following approach work, however, the number of gains is only twice the number of states in the actuator plant and its controls. For this simple system with feedback from point A, it has been found that 4 gains are needed for the feedback controller, and two gains for the state observer, regardless of the number of delays or track offset.

In the offset head case, where the write element is offset from the read element by a large number of tracks, the number of gains could be quite large for a conventional solution. For instance, with 50 sectors and an offset of 4, the delay would be 200 steps, and the number of feedback gains would be 202 for the observer and 202 for the controller. In addition, the offset increases as propagation continues, so that the gains and the entire model would need to be reformulated with growing complexity.

In the present approach as described below, the number of gains required is 4 regardless of the offset, and the computation burden does not increase. Furthermore, the solution is robust to offset changes, and it appears that a good gain choice results in stable propagation for all offsets. This result has been confirmed in simulation. It suggests that stable propagation can be designed in by good choice of actuator control. The total offset and the fact that it changes over time have no effect on the design.

The alternate approach is interpreting position measurements as coming from time B instead of time A. From this perspective, the number of controller gains is again 4 for what follows, but no simple solution for the observer has been deduced. The computation would require 52 gains to asymptotically deduce the values of the 52 state variables. The computation would grow larger as the offset grows.

Accordingly, the position signals are interpreted as coming from the read head at time A, and an observer of order 2 is easily designed for the plant in the conventional way. This requires two feedback gains. Because all the other states are just delayed versions of the output of this observer, the values from the observer need only be stored as estimates of the states. This is sufficient to get exponentially rapid estimates of the state of the plant. In the presence of noise, the Kalman filter gains could be used to get the best state estimate in the presence of noise. In the absence of noise, the exact state of the plant may be deduced in two time steps or less. Because modeling is certain to not include some real dynamics, however, a more practical choice in gain would be made trading off model error and convergence.

Figure 4:
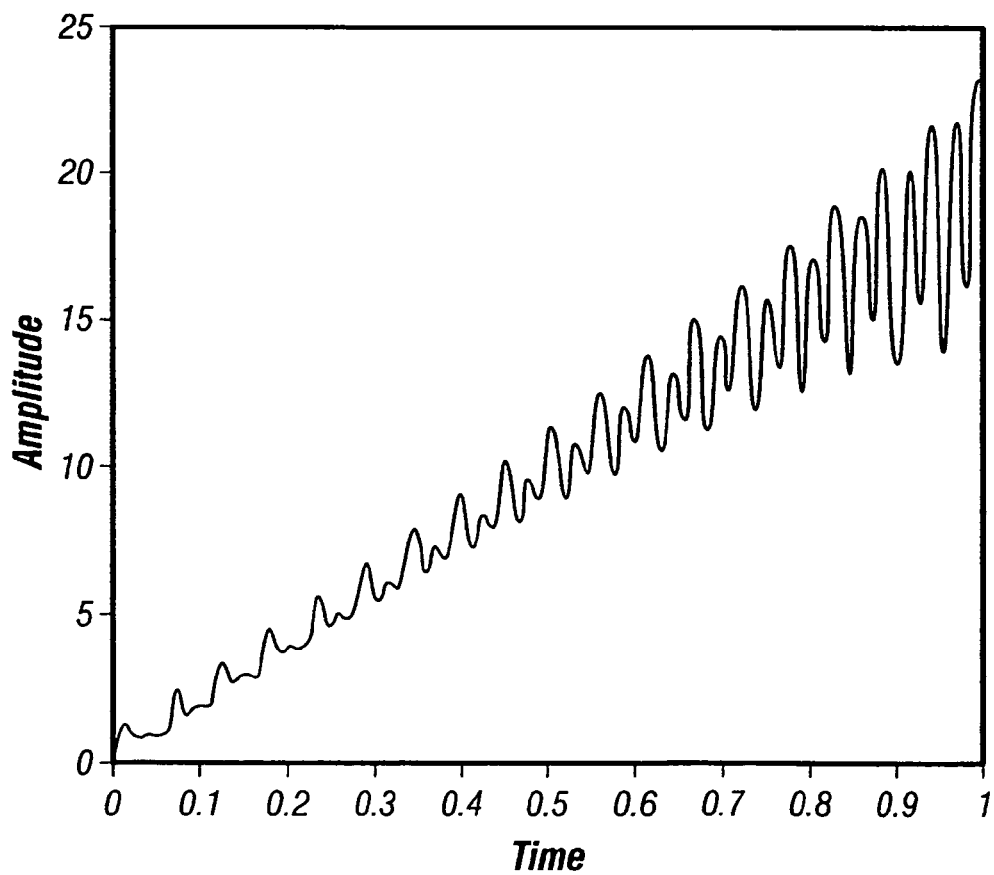
FIG. 4 is a plot showing the amplitude response of the positive feedback system of FIG. 3.

The amplitude response of the positive feedback system 10 is shown in FIG. 4. The first step or two show amplitudes having nearly the correct amount, but then the inherent instability overwhelms the performance. Contributing to the poor performance is the fact that head position is recorded at every time step. As shown in the amplitude response, the step has not settled out before recording positions on the disk or in the memory of the observer. Given that this position information would be coming from computer memory (from the observer), one would use the stored positions from memory, ignoring the motion transients entirely. In practice, during steeping and track following, the actual track information stored would be recirculated. To simulate this correctly would require a nonlinear model, i.e., one which would not "record" while the head was stepping. The analysis would be more difficult, but the result would be the same; the relevant system dynamics would be equivalent. This simple model of the present example makes the mathematical analysis quite easy. One may think of the recorded transient steps as errors in desired performance. These errors grow in an unbounded manner, which is easily proven. Even without the gross errors written in, small errors would exist and be compounded. As will be seen, the reason is that the system is inherently unstable.

The closed loop poles or eigenvalues of the system can be easily computed. The transfer function of this closed loop system is:

$$\frac{0.04498z^{51} + 0.04069z^{50}}{z^{52} - 1.655z^{51} + 0.7408z^{50} - 0.04498z - 0.04069}$$

and the magnitude of the closed loop eigenvalues, lam, are:
1.00000000000000
1.00128441000666
1.00128441000666
1.00311923282593
1.00311923282593
0.99941594633505
0.99941594633505
0.98981956587330
0.98981956587330
0.97988698326403
0.97988698326403
0.97149252217222
0.97149252217222
0.96448923434388
0.96448923434388
0.95851883298798
0.95851883298798
0.95330622394916
0.95330622394916
0.94865858392773
0.94865858392773
0.94443851708884
0.94443851708884
0.94054402002012
0.94054402002012
0.93689548120586
0.93689548120586
0.93342711600078
0.93342711800078
0.93008090596746
0.93008090596746
0.92680170448315
0.92680170448315
0.92353259334191
0.92353259334191
0.92020941336513
0.92020941336513
0.91675305785118
0.91675305785118
0.91305679541305
0.91305679541305
0.90896257125251
0.90896257125251
0.90421068691627
0.90421068691627
0.89831552533702
0.89831552533702
0.89019330434122
0.89019330434122
0.87697321760488
0.87697321760488
0.86319611259267.

Because 5 of the eigenvalues are of magnitude 1 or higher (indicating instability), the system is indeed unstable. Even if one were to let the transient steps die out before recording a position, small errors would still grow in an unbounded way, precisely as they do in uncorrected propagation.

The exemplary embodiment employs a time-domain feedback solution to control the unstable system and correct propagation errors during self-servo write. For a simple solution, the feedback method should not involve a large number of feedback gains; nor should it require a lot of states. The present method utilizes a remarkably simple solution that involves only the last two position measurements stored and the current state of the VCM and its control, both available from a state observer. The method also modifies the controller of the actuator, but this is within conventional or normal practice.

The simple solution of the present embodiment is arrived at by trying to find a set of feedback gains to stabilize this closed loop plant. To do so, the desired eigenvalues, lamd, are chosen to be 0.8 times lam. In this case, the factor 0.8 is enough to easily make the eigenvalues well under unity. It should be appreciated that any such factor would work. The solution to this problem is well understood as an eigenvalue placement problem. The system is converted to a very sparse state space model consisting of mostly delays, presenting a simple, straightforward process. In this case, the first two states of the model are the actuator plant, and the rest are delayed versions of the output. The result of the simulation produces the following feedback gains for the 50 states:

1.32411262046703
−0.53338911889084
0
0
. . .
0
0.17993629477021
0.65107977708745.

As seen above, a judicious choice of eigenvalues, in the coordinate system for the states chosen, the feedback gains are all zero except for four states: the first two involve feedback gains to modify the VCM actuator plant, and the last two gains (49th and 50th) involve the final position feedback estimates. To control the propagation, a controller need only know the two values of the state of the plant and the last two recorded positions, stored in the memory of the observer. Further, these gains show an invariance to the number of sectors and offsets; it appears that the only information required to stabilize radial propagation is related to the plant only. As offsets increase, evidence suggests that the gains converge to a fixed value. This final value can probably be used for all of propagation and will not change. Placing the correct feedback gains around the actuator can be done by standard techniques, and would require a low order observer or Kalman filter. The computation involved for only two variables (or however many within the actuator system in reality) is small. The rest of the observer is simply memory for the delays.

Figure 5:
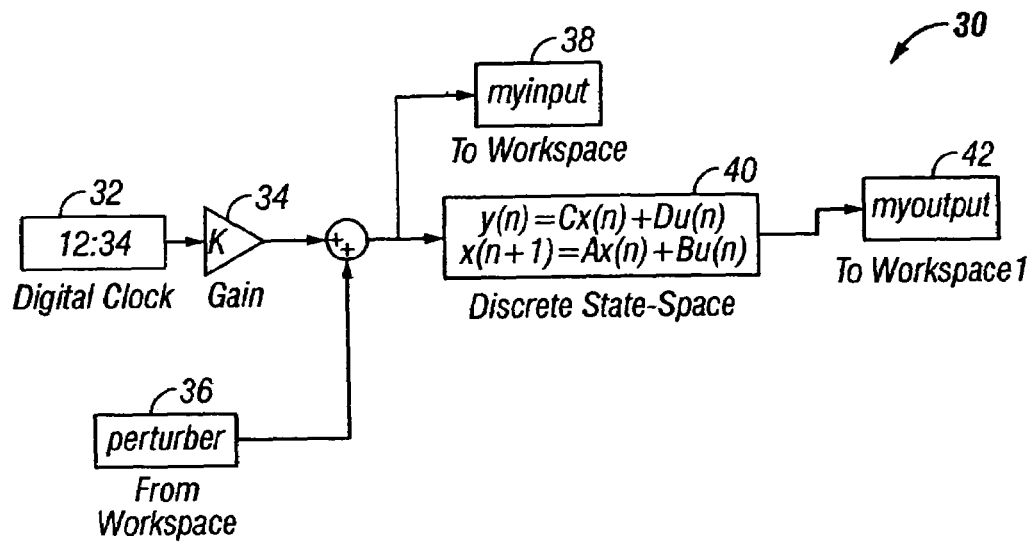
FIG. 5 is a block diagram of a simulation model using computed feedback gains to stabilize propagation according to an embodiment of the present invention.

As illustrated in FIG. 5, the simulation model 30 of the system according to the present embodiment employing the aforementioned feedback gains was built and simulated. The simulation model 30 uses computed feedback gains to stabilize propagation. Changing the plant with the feedback gains required an overall gain factor K, computed simply to get the proper step factor. The digital clock input 32 is simply a driving term which increments its output by 1 every 50 sample times, or 0.050 second. After applying a gain 34, the digital clock input 32 is summed with the perturber input 36 from workspace "myinput" 38 in one path. In another path, the sum is passed through the discrete state-space model 40 of the completed plant, including the feedback gains and observer, and then to a workspace "myoutput" 42.

Figure 6:
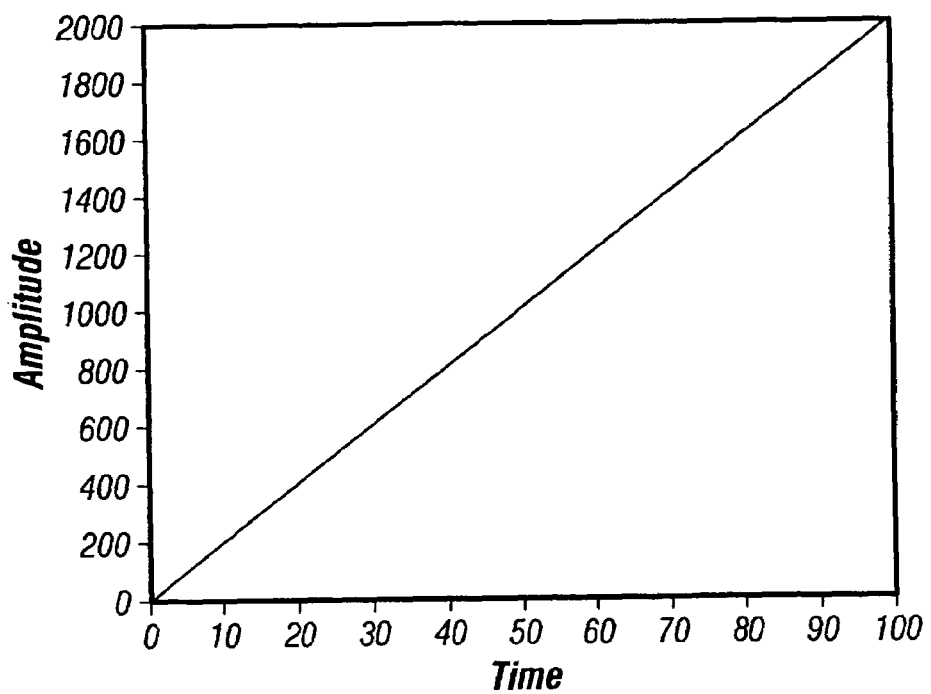
FIG. 6 is a plot showing the result of a simulation run using the simulation model of FIG. 5.
Figure 7:
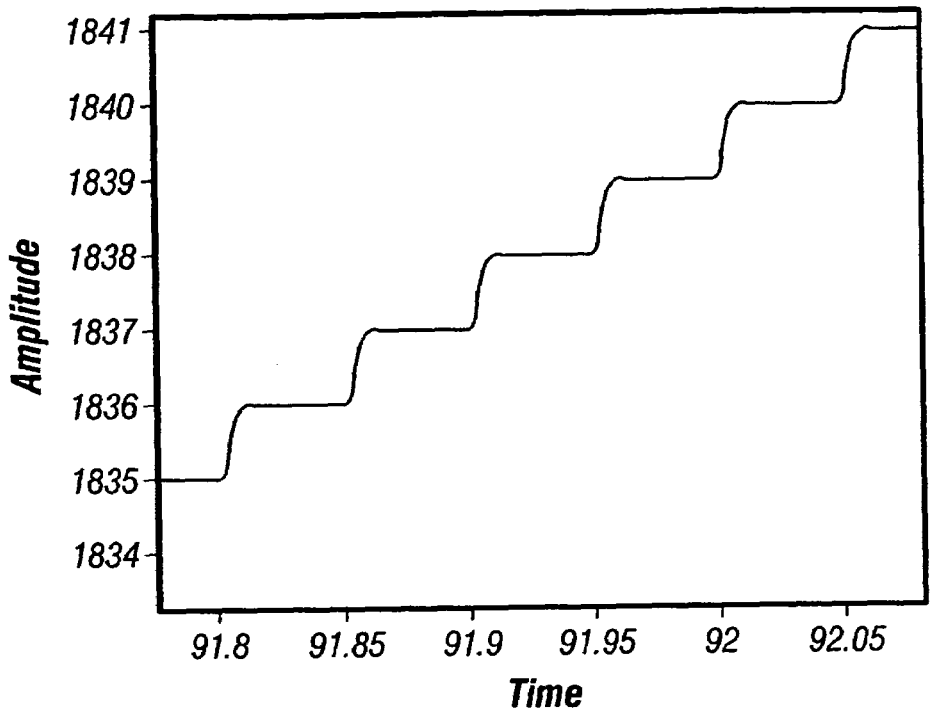
FIG. 7 is a blow-up plot of FIG. 6.

The resulting graph in FIG. 6 from simulation is a plot of 2000 steps. As shown in the blow-up plot of FIG. 7, each step is highly stable. Again, the unwanted transient information has been included and is recorded as positions on the disk or in the observer, but even these disturbances do not destabilize the process. The real process would not record positions during the transient move, but after settling. As previously mentioned, the actual position estimates or direct measurements could be stored in the observer memory and recirculated, and used until transients die away and it is time to write real position bursts on the disk.

The perturber 36 in the model 30 was introduced to test the response to unwanted disturbances. In the description below, the perturber 36 was turned off. The simulation used the actual state variables from the simulation, not observer variables, although the results would have been identical. In practice, the second order observer would need to be used, as demonstrated in practical systems. It is known that if the closed loop gain of the actuator system is less than one, then stable propagation would result. Thus, one should check to make sure one has not cheated by making the actual actuator dynamics degraded to a closed loop gain of less than one.

There are two possible ways to design the system. The first is to design the actuator loop, and then compute the corrective gains. The second, which is preferred, is to design the actuator for performance by normal control methods such as, for example, a high performance PID (Process Integral Derivative) control designed by Bode plots or optimal control methods, both using the low order state observer for getting the relevant feedback terms. However, a numerical simulation experiment has shown that once this compensation is designed, the loop should not be closed. Rather, the closure should be done by going through the gain calculation for stabilizing the radial process outlined above.

The following demonstrates the second way of designing the system by control methods for a plant having an integral control. This example also uses 50 sectors, although any number is permissible. In fact, the same.feedback gains designed for 50 sectors and 0 offset have been tested for 500 sectors and delivered the same performance. An equivalent is a disk with 50 sectors and an offset of 10 tracks. Accordingly, there appears to be no impediment for a large number of sectors and offsets in the present embodiment of the invention.

Figure 8:
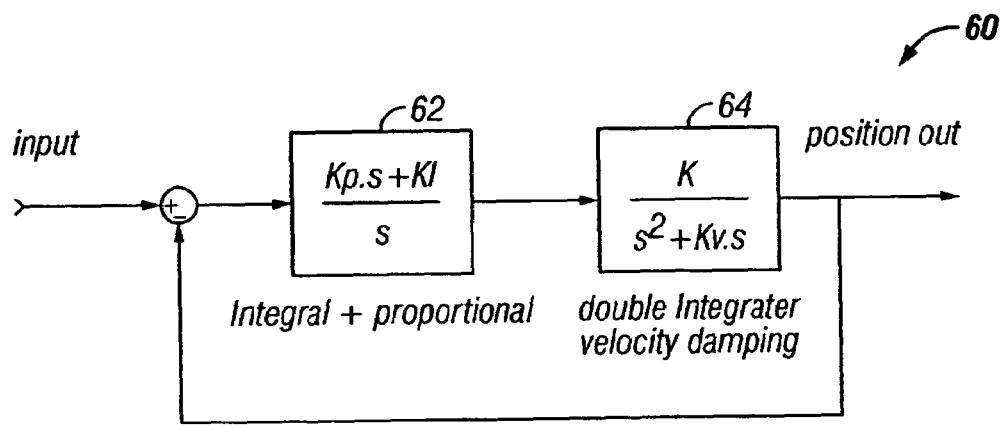
FIG. 8 is a block diagram of a PID designed system according to an embodiment of the present invention.

In the example, the plant is a double integrator with an additional integral control. Proportional and derivatives control terms are built into the plant. The disk rotational rate is 12,000 rpm, so that the sample period is 0.0001 second. The identical results can be achieved with 100 sectors at 6000 rpm. This corresponds to a simplified normal actuator design case for the disk servo engineer, i.e., the design of a feedback controller that should have a high stiffness and high loop gains for disturbance rejection. Such a continuous time plant 60 is shown in FIG. 8. The input passes through an integral and proportional block 62 and a double integrator velocity damping block 64 to produce the position output. The integral and proportional block 62 is a conventional PID controller block. The double integrator block 64 models the dynamics of the pivot and arm. The blocks 62, 64 include three state variables (the plant/actuator, the integral term in the controller, and the integral variable in the observer). A closed loop feedback is used for designing the system. After the design is completed, the loop is opened before the next step of completing the SSW design.

Figure 9:
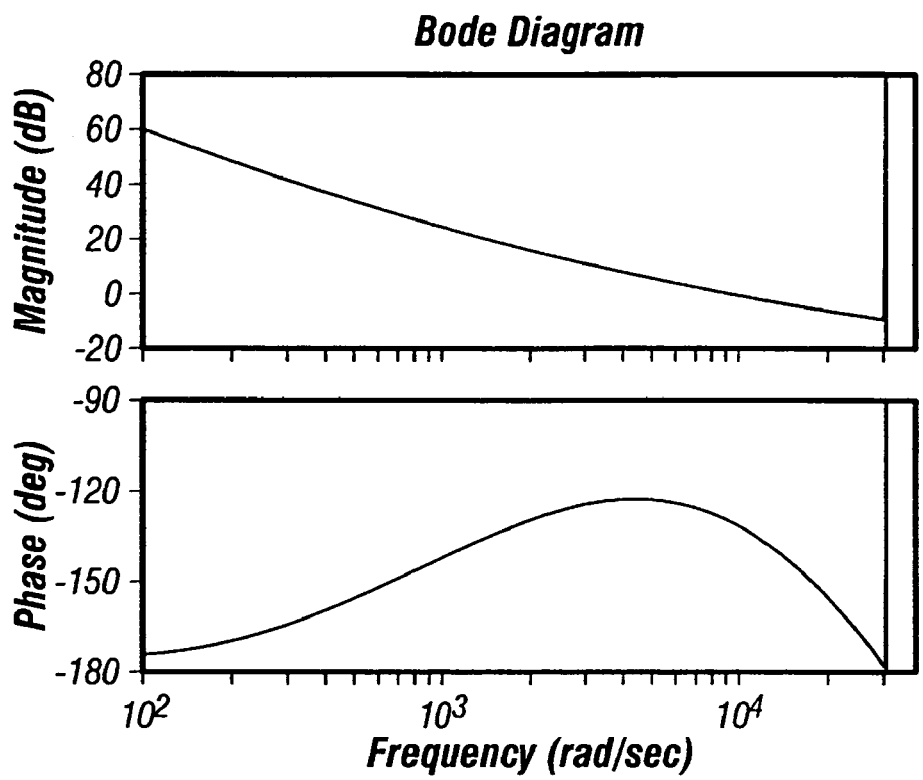
FIG. 9 is a Bode diagram showing magnitude and phase versus frequency of an open loop transfer function for the PID designed system of FIG. 8 according to a first example.
Figure 10:
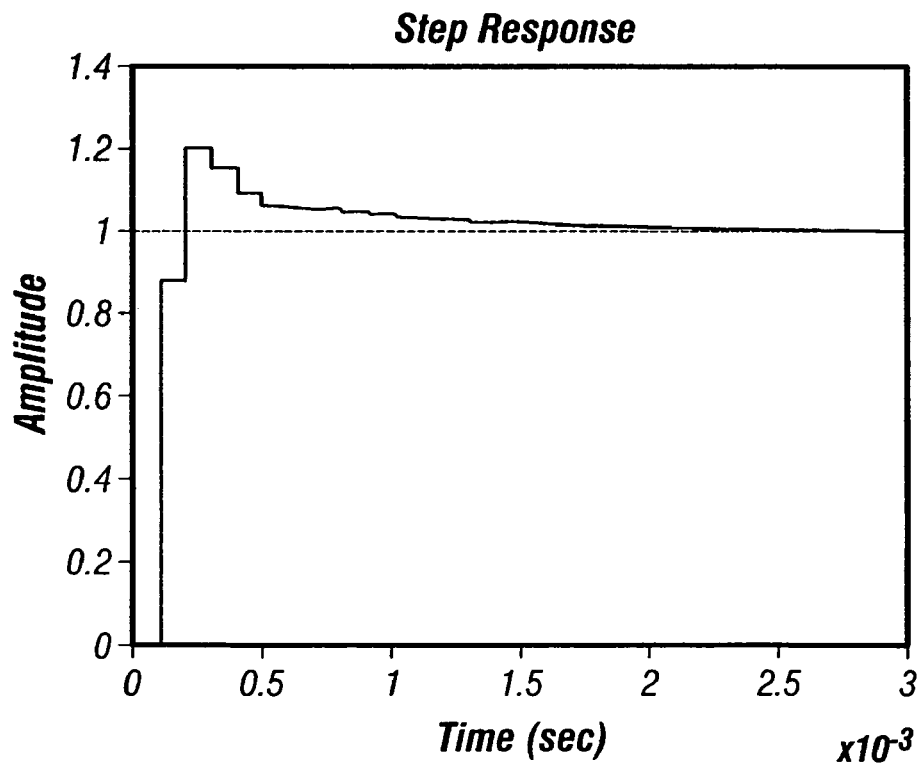
FIG. 10 is a plot of the step amplitude response of the PID designed system of FIG. 8 for a closed loop situation in the first example.

In the PID designed system 60 of FIG. 8, the gains for $K_v$, $K_p$, $K_i$, and K are chosen to be $K_v$=8E4, $K_p$=1, $K_i$=1000, and K=8E8 in a first example. This design is performed using classical Bode methods, but the state variables are assumed to be available and would come from a state observer. This is a simple, normal design process. The discrete time version of these two blocks 62, 64 in series with a sample rate of 100 microseconds yields the open loop transfer function of $$\frac{0.875z^2 - 0.6629z - 0.1122}{z^3 - 2z^2 + 1.001z - 0.0003355}$$

and an open loop transfer function plot shown in FIG. 9. If one were to close the loop, as shown in FIG. 8, the step amplitude response of the system 60 would be as seen in FIG. 10.

Figure 11:
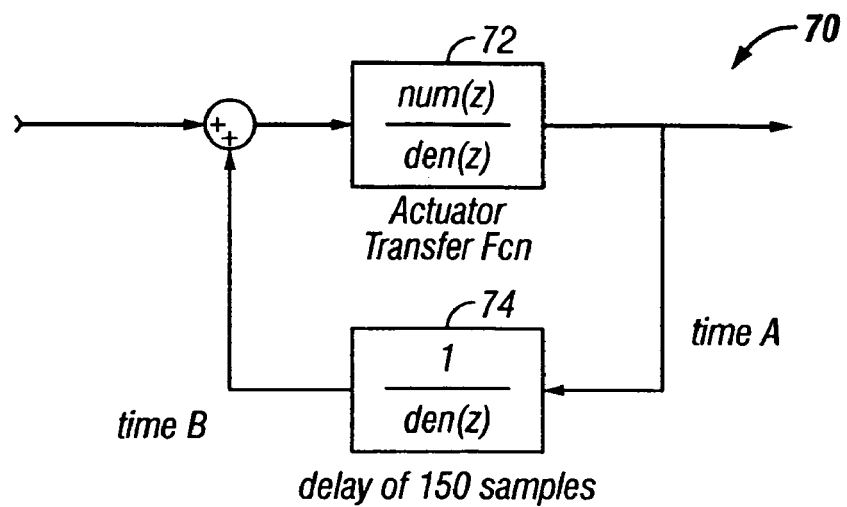
FIG. 11 is a block diagram of a PID designed system with a delayed feedback according to another embodiment of the present invention.
Figure 12:
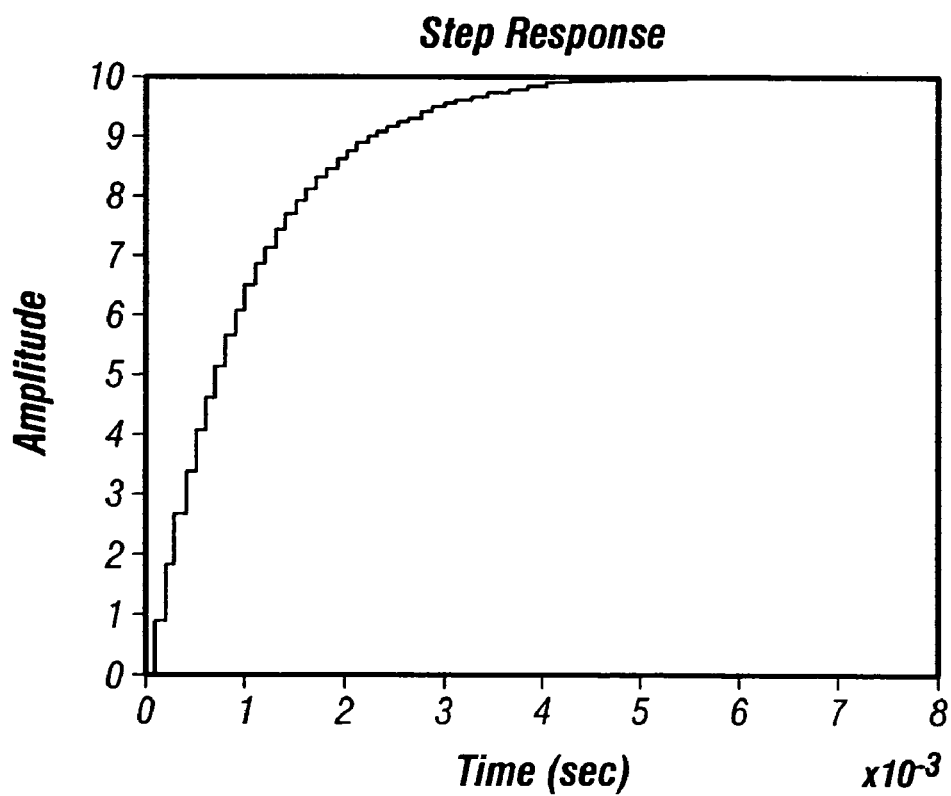
FIG. 12 is a plot of the a single step amplitude response of the PID designed system of FIG. 11.

FIG. 11 shows a system 70 with a transfer function block 72 and a time delayed feedback 74. The delay in this example is a delay of 50 sectors. There is a track offset of 3. Hence, the total delay to be used in the computation is 150 samples (instead of the delay of 50 samples in FIG. 3). The eigenvalues are computed as before, and a multiplier of 0.9 is chosen. The resulting feedback gain is similar as before, with a vector of 153 elements having entries in the first three elements and the last three elements. Simulation experiments have shown that a delay of 50, 150, or 300 produces the same set of feedback gains. Using these 6 gains to close the loop results in a stable system, in which a single step of the system is illustrated in FIG. 12. Because there was a designed-in low frequency gain above 1, the input command needs to be scaled. The actual factor is 9.997. This system will propagate stably as in the previous example.

Two possible pitfalls checks are performed. The first possible pitfall is that the mechanism developed simply produced an inner, read head servo loop having a closed loop gain of less than 1. This would be the now classic case where propagation would work easily but the resulting system would have poor disturbance rejection and high TMR, and is not a good candidate. From the step amplitude response shown in FIG. 12, this is clearly not the case. The result shows an accurate representation of the inner loop performance. The second pitfall is the possibility of simply "cheating" by making the actual actuator dynamics degraded to a closed loop gain of less than one. This is shown to be not the case. The present method involves building a conventional, high performance PID system, and then correcting it to stabilize the design for SSW.

Figure 13:
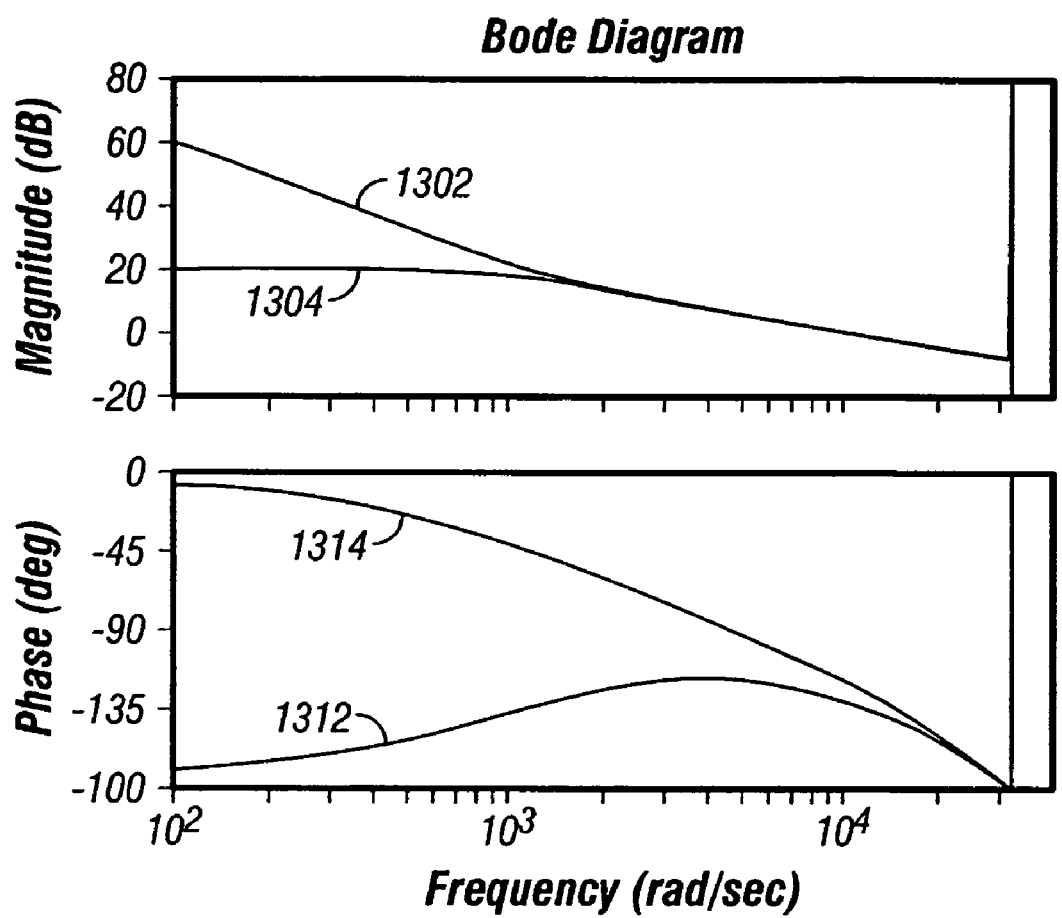
FIG. 13 is a Bode diagram comparing the open loop PID system of FIG. 8 before correction and the SSW friendly corrected inner loop of FIG. 11 in the first example.

FIG. 13 shows a plot of the original open loop PID before correction and the SSW friendly corrected inner loop in the first example. The curve 1302 starting at 60 db is that of the open loop PID system (with corresponding curve 1312 in the phase plot). One notes that the SSW friendly loop 1304 has a gain of 10 (20 db), well above unity (with corresponding curve 1314 in the phase plot). Thus, the system has not simply "cheated" by building a low gain inner loop. In fact, if the PID loop had been closed as in a PID designed system shown above, the system would have a gain marginally greater than 1. This design has yielded a high loop gain system which would produce low TMR compared to the conventional loop closure.

In the second example applying the methodology of the present embodiment as shown in FIG. 8, the PID designed system has different eigenvalues to provide actuator performance that is less demanding than the first example. The integral and proportional block 62 has the following expression:

$$\frac{s+500}{s}$$

and the double integrator velocity damping block 64 has the following expression:

$$\frac{1 \times 10^8}{s^2 + 40000s}$$

The discrete time model for this system with a sample rate of 100 microseconds is $$\frac{0.1886z^2 - 0.1224z - 0.05394}{z^3 - 2.018z^2 + 1.037z - 0.01832}$$

Figure 14:
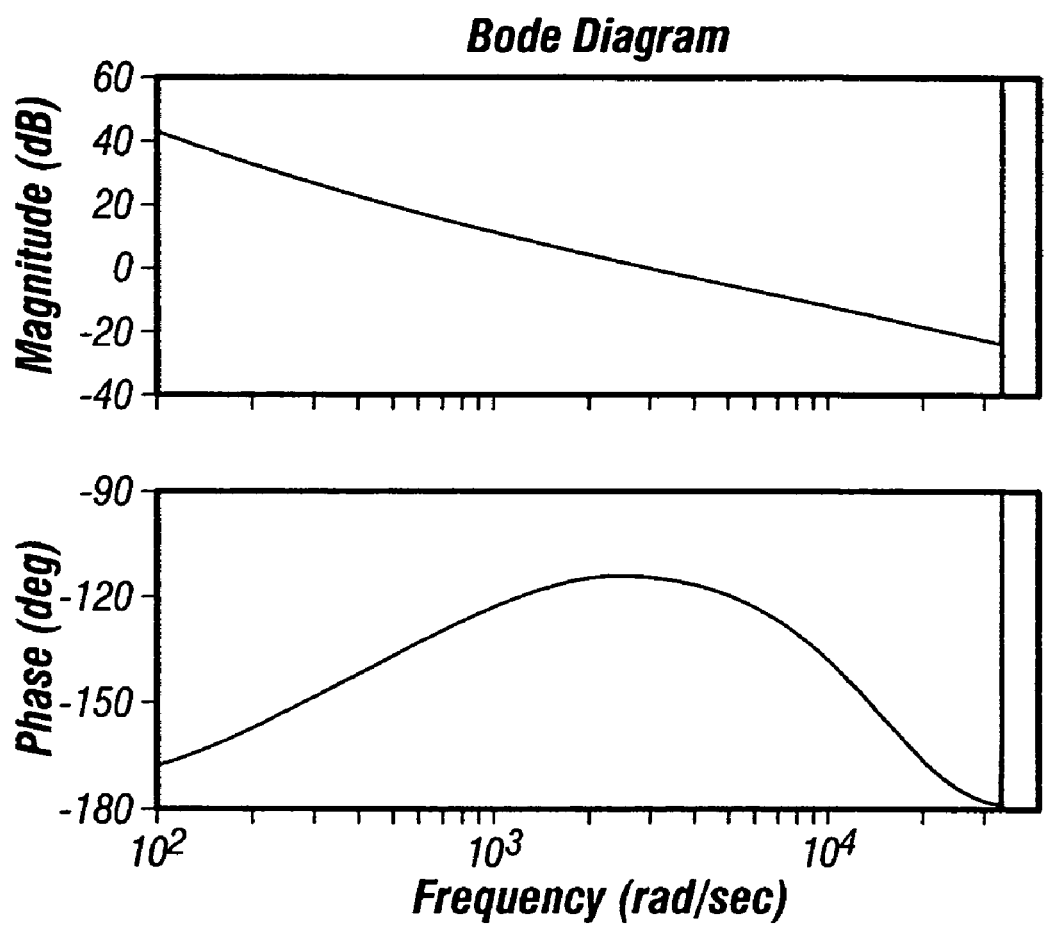
FIG. 14 is a Bode diagram showing magnitude and phase versus frequency of an open loop transfer function for the PID designed system of FIG. 8 according to a second example.
Figure 15:
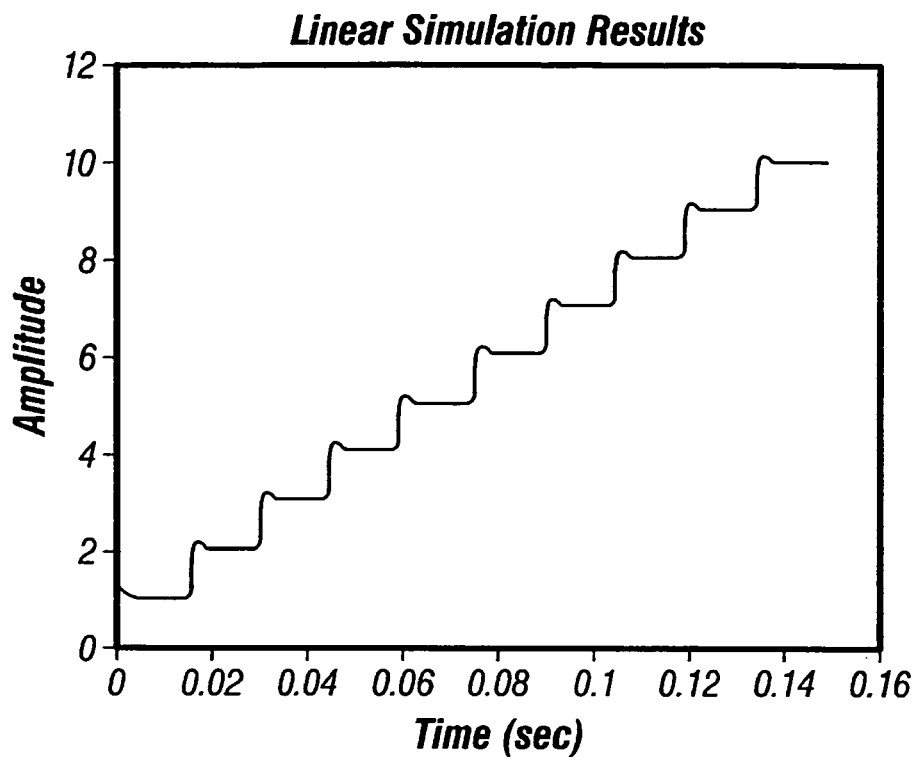
FIG. 15 is a plot of the amplitude response of the PID designed system for the first few steps in the second example.
Figure 16:
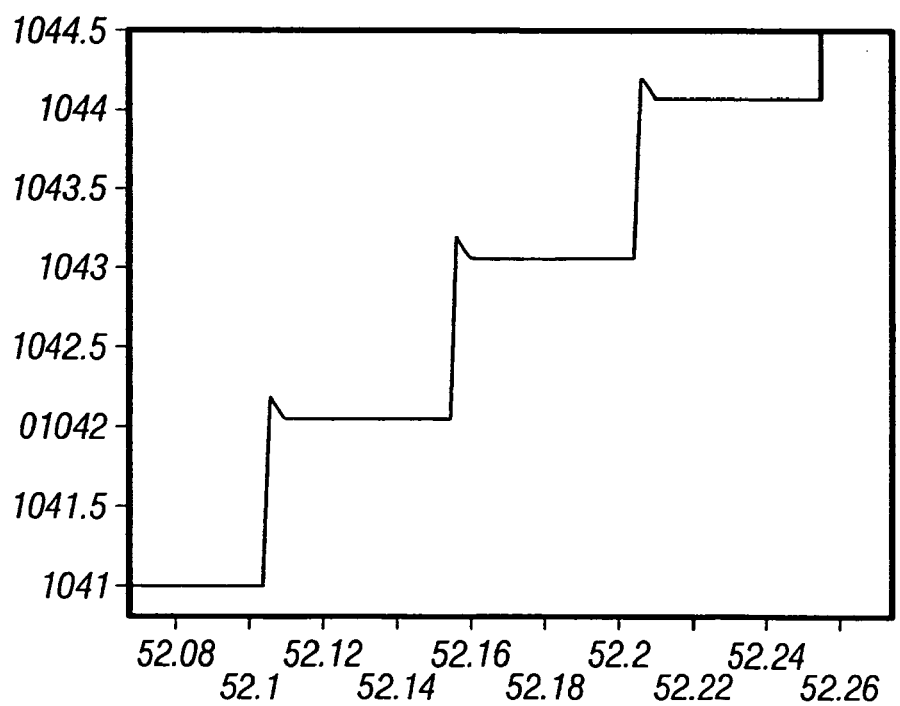
FIG. 16 is a plot of the amplitude response of the PID designed system for a few steps after propagation of over 1000 steps in the second example.

As shown in FIG. 14, the open loop Bode plot of the discrete system is similar to that of a classically designed PID for a continuous plant. For this second example, 50 sectors are used, but the results are valid when a different number of sectors is used, such as 500 sectors. FIG. 15 shows the first few steps of the propagation, while FIG. 16 shows a few steps after propagation of over 1000 steps. This system appears stable based on the simulation results. These two examples shown in FIGS. 9 and 14, respectively, are used to compare the transfer functions of the inner loop.

Figure 17:
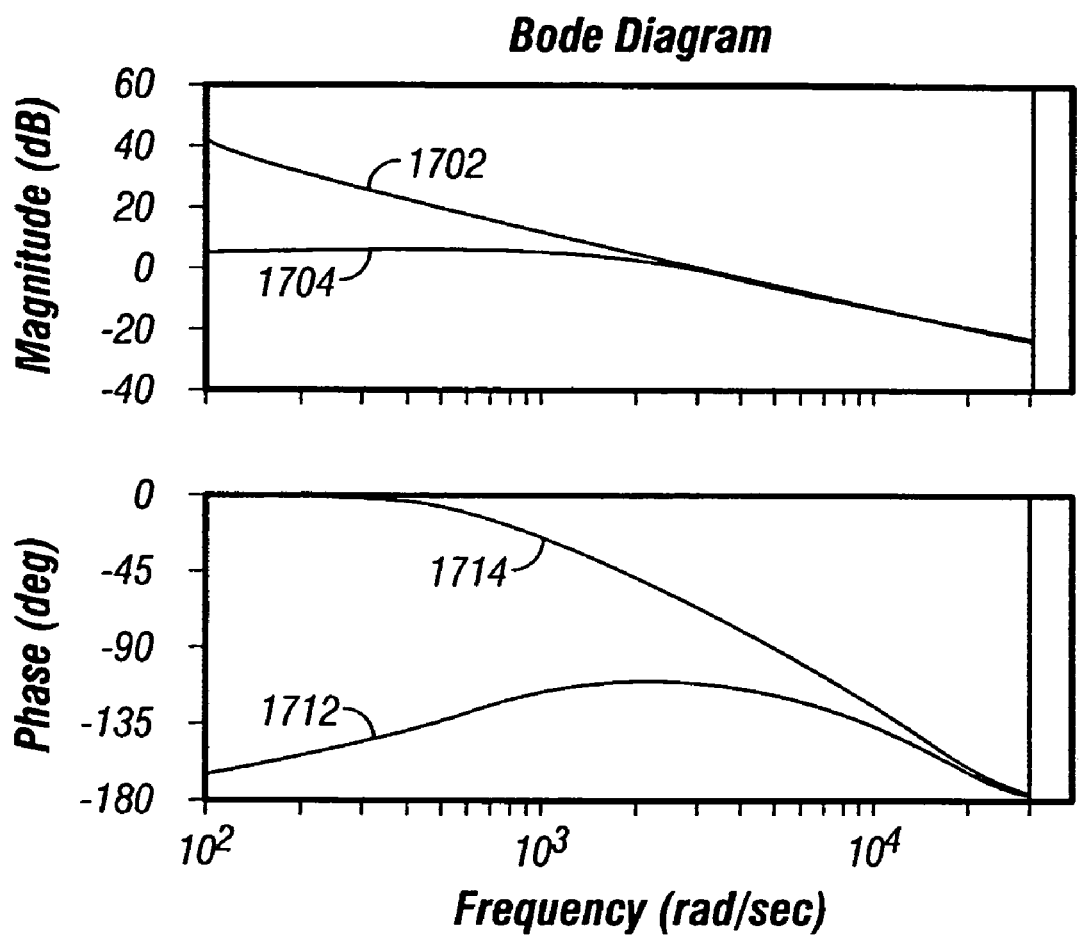
FIG. 17 is a Bode diagram of the open loop PID system of FIG. 8 before correction and the SSW friendly corrected inner loop of FIG. 11 in the second example.

FIG. 17 shows a plot of the open loop PID and the actuator's only response using the first three feedback gains (e.g., the inner position loop is closed while the propagation loop is not closed). The open loop curves (1702, 1712) and the SSW friendly curves (1704, 1714) are shown in the magnitude and the phase plots.

Figure 18:
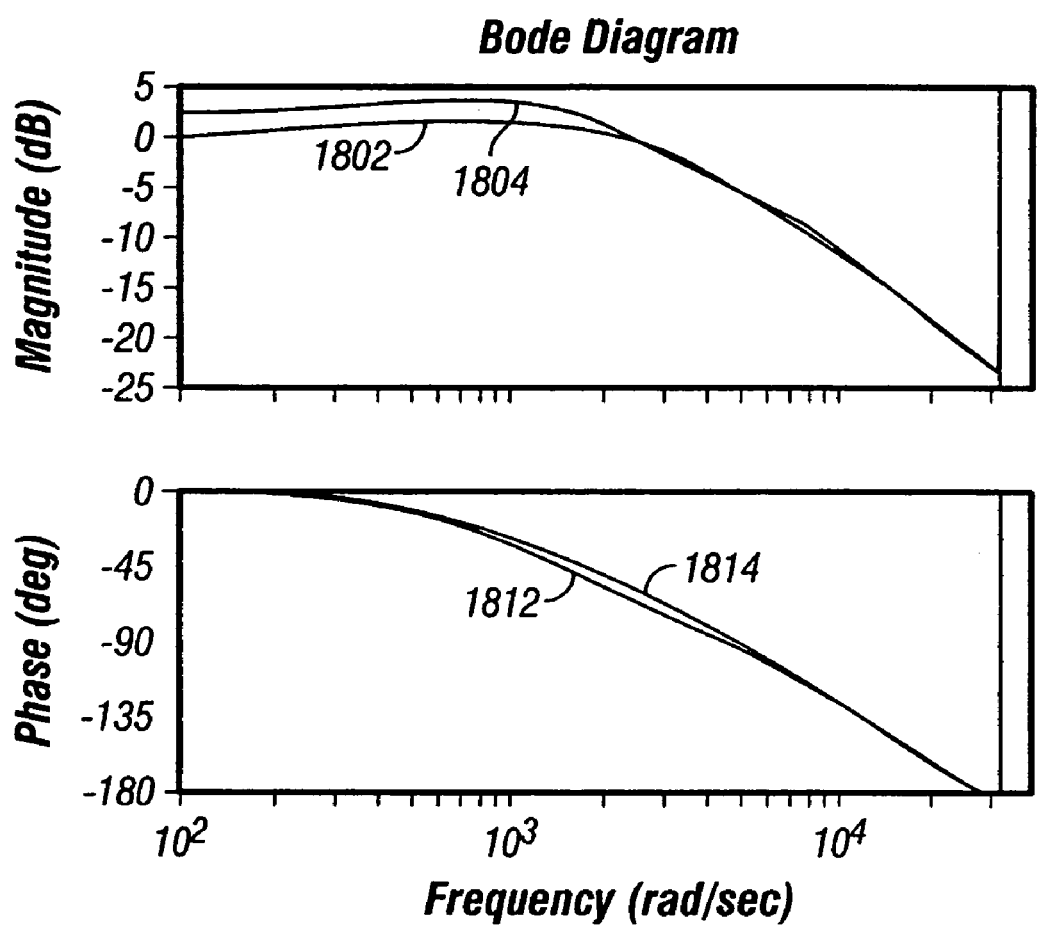
FIG. 18 is a Bode diagram of the SSW friendly design, along with a closed loop response of a normal actuator design.

By comparing the closed loop response of the normal actuator design (1802, 1812) with the new SSW friendly design (1804, 1814) for the second example as shown in FIG. 18, one notices that the new design has a higher gain and a bigger bandwidth. As in the case of FIG. 13, the high gain version is SSW friendly, and the system has not "cheated" by making the inner loop gain less than 1. Indeed, the inner loop gain is greater than 1, and greater than the "normal" design. It is noted that an even higher bandwidth system would require more Fourier correction terms in the standard SSW radial process.

To summarize, the design for a stable SSW process would keep much of the system as it has existed. A low order state observer or Kalman filter needs to be designed for the plant dynamics, which is a simple task. The remaining observer states can be formulated as just delays. Most of the observer will be simply storing the output of the low order observer in memory. For such a system, a design rule has been described for picking the stabilizing gains for the plant and those on the delayed output. This solution takes very few gains—only twice the order of the actuator plant model. Simulation experiments have shown this stabilizing solution persist for any offset. The fact that the simulations have built-in errors of the position transients being "recorded" only demonstrates the robustness of the result. In actual propagation, one would not use the transient data from memory, but the recorded position data for the track.

One more design feature is evident and comes up whenever there is a state observer or Kalman filter in a system. To make this work, as was seen, only the state variable from the actuator dynamics is needed. Rather than recording the output of the observer through the delay gain, one could rely solely on the stored position measurement at each sample directly. Observer theory points out there will be no difference in performance. In a low noise environment, one would use the directly measured positions in feedback control. Most of the observer output, except for the values for the actuator states, would not be used. In a noisy environment, however, the observer (or better, Kalman filter) could give better position measurements than the raw values read from the disk. Improved position measurements due to filtering could further improve TMR and squeeze. Since one can easily write down the closed loop transfer function for propagation, noise analysis is quite easy within this framework.

In a real system including pivot resonances and other high order dynamics, there is only a simple requirement to be met. Any observer design or other methodology needs to provide a servo gain strategy for the actuator state, whatever such strategy might be. For example, an adaptive, model referenced control scheme would be acceptable. Any scheme which allows adjustment and modification of the plant dynamics outlined here would be sufficient. There is no inherent problem in making any control system scheme SSW friendly, as long as the very few gains required are adapted as well. For high performance, SSW should look to the product design team for high performance algorithms where structural modes and other dynamics not discussed herein are considered. Any high performance scheme can be made SSW friendly by following the procedures outlined herein.

Figure 19:
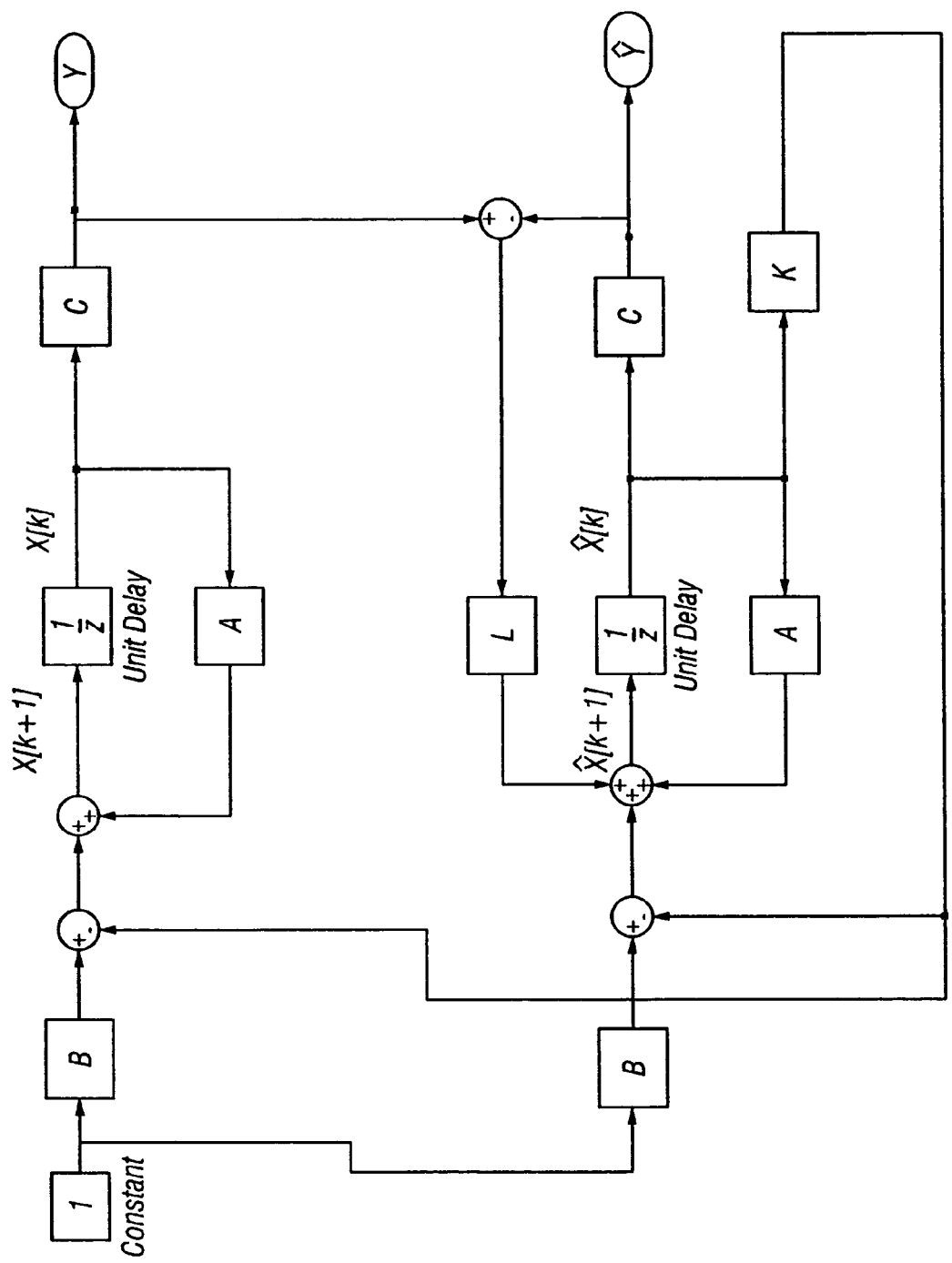
FIG. 19 is a diagram of a typical state observer controlling a system.

FIG. 19 shows a typical state observer for controlling a system. The system of difference equations is shown in the top half of the diagram. The following state equations are represented in FIG. 19:

$$x[k+1]=Ax[k]+Bu[k]$$

$$y[k]=Cx[k]+Du[k]$$

$$D=0$$

The observer and the generated output coming from the feedback K is shown in the bottom half of the diagram. The "x-hat" symbol represents the observed states. L represents the observer gain, which is designed by the user by optimal techniques for noise or other methods. K represents the stabilizing feedback gain, which may be designed by any suitable method. The actual state x is an n×1 vector, the control output y is a number, u is the control input, A is an n×n matrix, B is an n×1 matrix, C is a 1×n matrix, D=0, and L is an n×1 matrix. The observer is designed to be stable, so the x-hat observed states converge to the system states. Thus, all the system states for feedback can be seen, although they cannot be directly measured. This diagram is very typical for state observers or Kalman filters. A Kalman filter design would simply be an optimal design of the feedback gain L, which drives the observer.

The present invention may also be applied to reduce track squeeze. Returning to the second order simple model with 50 sectors per rotation, the plant transfer function is:

$$\frac{100000}{s^2+300s+100000}$$

The same rate is 0.001 seconds, and the same feedback found in the first solution is used. The system as designed works as reported. However, it suffers greatly in the presence of disturbances. Such disturbances may affect track squeeze, where track squeeze refers to the local track to track spacing. If disturbances are large, tracks written next to each other may be squeezed together, causing data read errors.

Figure 20:
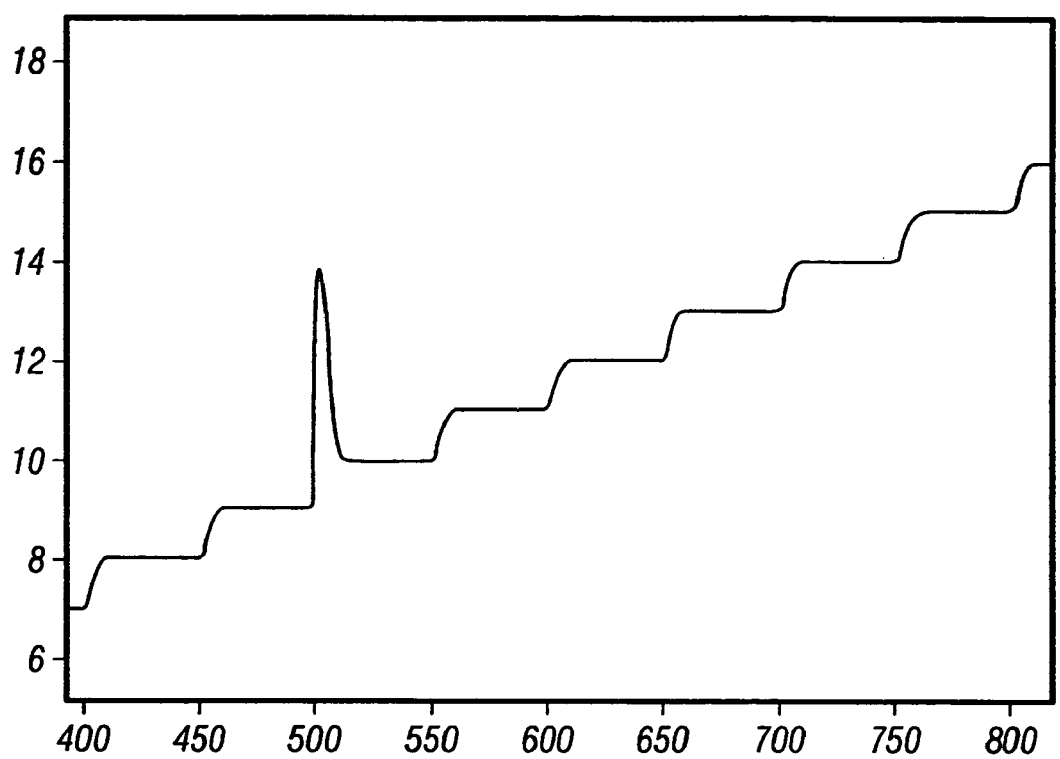
FIG. 20 is a plot of the behavior when a large disturbance is introduced into the closed loop system of FIG. 3.

Optimal Linear Quadratic Control Design Theory offers a way to design servo systems, and in this case provide a design to reduce the effect of track squeeze. This design also yields a set of feedback servo gains, where only a few of these feedback servo gains are nonzero. If x(t) is a vector of the states of the system (in this particular case, 52 states) and u is the control input, a continuous time quadratic cost function may be:

$$\frac{1}{2}\int_0^\infty (x^T Q x + u^T R u)\,dt$$

where Q is a positive semi-definite and R is a positive definite, or in this particular case, a positive scalar. The discrete time case requires only that the integral be replaced by a summation. The solution to such problems is readily known; the problem lies in picking suitable matrices R and Q which forces any desirable behavior in the system. Regarding track squeeze, if a very large disturbance is introduced into the closed loop system from FIG. 3, the solution previously given results in the behavior as shown in FIG. 20. A large PES (position error signal) spike has been introduced at the 500th servo step. The simple feedback solution results in a track shape which overruns tracks 11 and 12. Further, tracks 11 and 12 are written as if nothing has happened; hence, these tracks actually cross. Thus, this servo design does nothing to mitigate squeeze in any way. In what follows, the same disturbance will be introduced to a servo designed by Quadratic methods, and a Q matrix will be selected which does penalize squeeze. This involves a feedback solution with a small number of gains. This is one of many possible designs to address difficulties in servo writing. Other possible designs may solve other difficulties in servo writing such as repeatable runout (RRO), track mis-registration (TMR), etc.

One way to construct a cost to account for squeeze is to form the term:

$$(1+x_1(k)-x(k)_{52})^2$$

which is the difference between the first state and the last state at time k. These two variables are spatially separated by one track. If there is no squeeze, the cost should be exactly zero. Ideally, the tracks should be as close to one physical track apart as possible. The cost in the Q matrix of the quadratic cost function may as well be defined as symmetric. For example, four entities of Q may be selected to be nonzero: the (1,1) and (52,52) entry are each 10000, and the (1,52) and (52,1) entry are −10000. This makes the Q part of the performance index to be exactly:

$$10000(x_1(k)-x(k)_{52})^2$$

if the ½ factor is ignored from the formulation. The constant 1 in the performance measure is missing, but this cost captures the flavor of the problem, and it easily solved.

Figure 21:
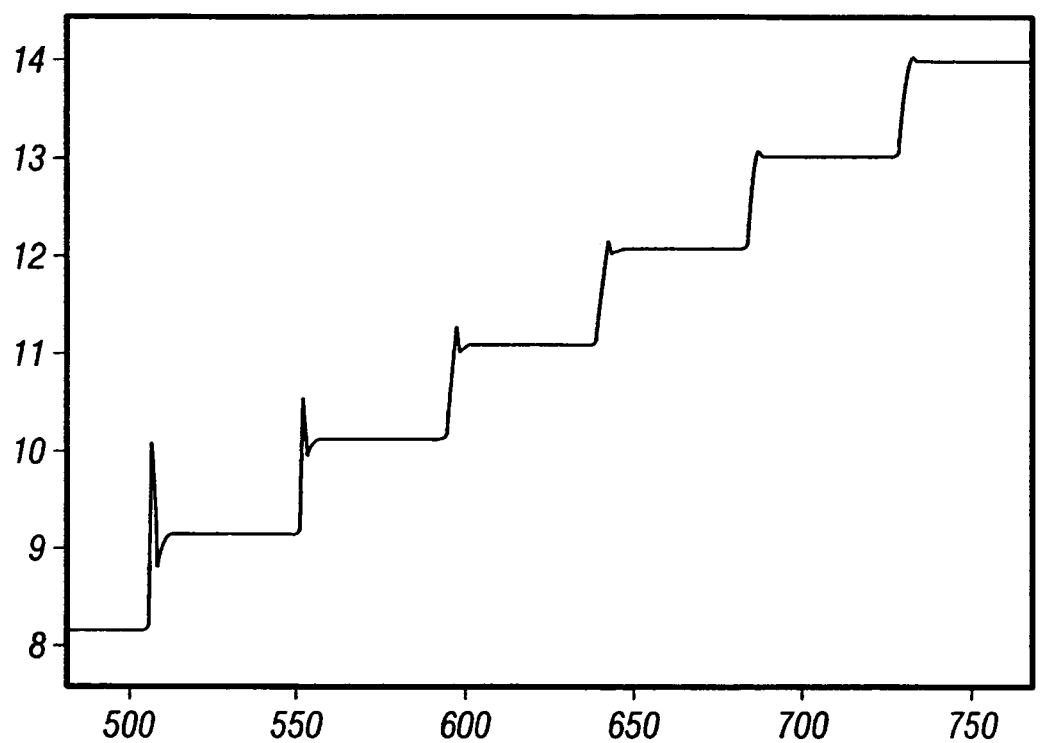
FIG. 21 is a plot of the response to a large disturbance of a stable system with improved track squeeze.

Also, R may be chosen to be 1, and the problem may be solved for feedback gains. The resulting gains are nearly zero except for the 1, 2, 51, and 52 entries. All the other feedback gains are set as zero for completeness. The resulting system is stable and the response to the disturbance is shown in FIG. 21. Thus, track squeeze is clearly improved. While the first perturbed track makes an incursion all the way into the following track position, the track written next makes an effort to avoid this incursion, and the tracks do not cross. Subsequent tracks continue to avoid the incursion and eventually return to an unperturbed state. Many other servo write performance indices may be constructed to address specific problems.

Figure 22:
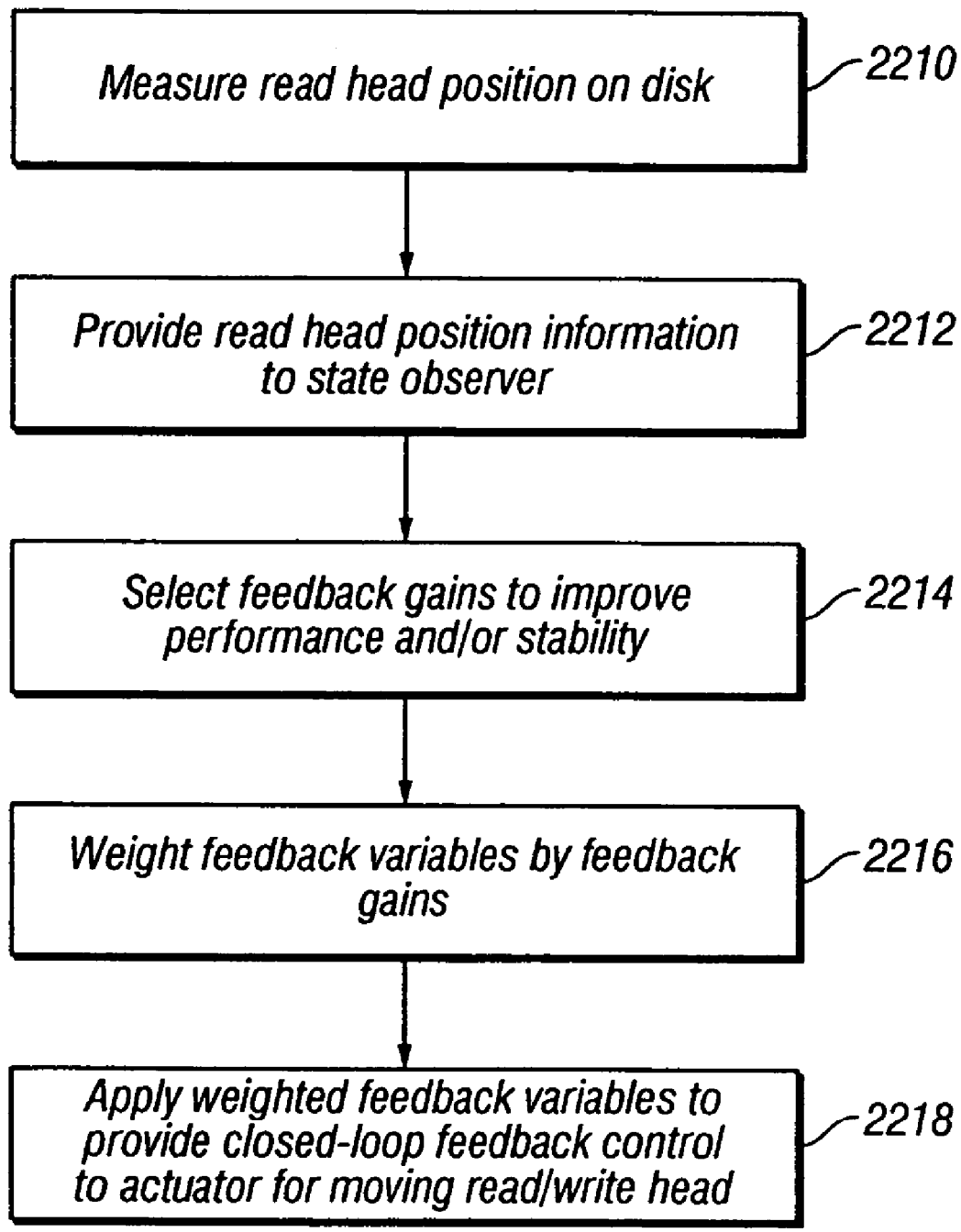
FIG. 22 is a flowchart of the control methodology for self-servo writing according to an aspect of the present invention.

FIG. 22 shows the methodology according to an exemplary embodiment of the present invention. A feedback method is implemented where feedback gains are used to stabilize the SSW process and correct for possible errors. In step 2210, the read head position on the disk is measured, and may be recorded in memory. In one embodiment of the present invention, the read head may follow a servo design path on the disk.

In step 2212, the position information is provided to a state observer, which may be a Kalman filter. The position information may include the position and velocity of the actuator and integral term of the actuator controls. Based on the measured read head position information, the state observer produces a set of feedback variables. The feedback variables below the last written track (last recorded) and below the read head (current state) are most important. The feedback gains which improve performance and/or make the system stable are chosen a prior. Such feedback gains may be automatically chosen according to a predefined set of design rules specified by a user, where scaled eigenvalues of the control system are chosen. In alternative embodiments, the feedback gains are selected by applying a design scheme such as the optimal linear quadratic control design theory and optimizing the continuous time quadratic cost function. In addition, the feedback variables are weighted by the feedback gains, also a prior. The predetermined feedback gains for the feedback variables may be provided, for example, in a lookup table. In step 2218, the weighted feedback variables are applied to provide the closed-loop feedback control to the actuator for moving the read/write head to servo one propagation track out on the disk and write a new set of position information in the new track. The control system loop is "closed" using the weighted feedback variables. Steps 2210, 2212, and 2218 are repeated for every cycle to stabilize the SSW process, and preferably are performed in real time. While the gains have been determined a priori, there may be changes in the gains as propagation proceeds due to, for example, stiffness changes of the pivot. In that case, the controller may determine gains based on what it sees as the current plant model. The present methodology aids in keeping the system stable and/or achieve better performance in self-servo writing.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A system for controlling a read/write head of a disk drive to correct propagation errors during self-servo writing on a disk, the system comprising a time-domain based controller to provide closed-loop feedback control to an actuator for moving the read/write head, the controller including a state observer, the controller being configured to, in real time:
   measure read head position information of the read/write head on the disk;
   provide the measured read head position information to the state observer which produces feedback variables for feedback control of the read/write head, the feedback variables being weighted by feedback gains which have been determined a priori; and
   apply the weighted feedback variables to provide the closed-loop feedback control to the actuator for moving the read/write head;
   wherein the feedback gains of the feedback variables for stable feedback control of the read/write head are provided in a lookup table.

2. The system of claim 1 wherein the state observer comprises a Kalman filter.

3. The system of claim 1 wherein the feedback gains of the feedback variables are determined a priori by calculating the closed-loop eigenvalues of the controller to provide closed-loop feedback control to the actuator and multiplying the eigenvalues by a scale factor to reduce a number of nonzero feedback gains to twice the number of states in the actuator and actuator controls.

4. The system of claim 3 wherein the number of nonzero feedback gains is smaller than about 50.

5. The system of claim 1 wherein the feedback gains of the feedback variables to achieve a preset desired performance are provided in a lookup table.

6. The system of claim 5 wherein the feedback gains are determined a priori by applying an optimal linear quadratic control design to produce improved track squeeze.

7. A self-servo writer for writing to a disk in a disk drive, the self-servo writer comprising:
   a read/write head;
   an actuator to move the read/write head; and
   a time-domain based disk controller configured to provide closed-loop feedback control to the actuator for moving the read/write head to correct propagation errors during self-servo writing on the disk, the disk controller including a state observer and being configured to, in real time,
   measure read head position information of the read/write head on the disk;
   provide the measured read head position information to the state observer which produces feedback variables for feedback control of the read/write head, the feedback variables being weighted by feedback gains which have been determined a priori; and
   apply the weighted feedback variables to provide the closed-loop feedback control to the actuator for moving the read/write head;
   wherein the feedback variables for stable feedback control of the read/write head are provided in a lookup table.

8. The self-servo writer of claim 7 wherein the state observer comprises a Kalman filter.

9. The self-servo writer of claim 7 wherein the feedback gains of the feedback variables are determined a priori by calculating the closed-loop eigenvalues of the controller to provide closed-loop feedback control to the actuator and multiplying the eigenvalues by a scale factor to reduce a number of nonzero feedback gains to twice the number of states in the actuator and actuator controls.

10. The self-servo writer of claim 9 wherein the number of nonzero feedback gains is smaller than about 50.

11. The self-servo writer of claim 7 wherein the feedback gains of the feedback variables to achieve a preset desired performance are provided in a lookup table.

12. The self-servo writer of claim 11 wherein the feedback gains are determined a priori by applying an optimal linear quadratic control design to produce zero track squeeze.

13. A disk drive having a servo pattern written on a disk by controlling a read/write head of a disk drive to correct propagation errors during self-servo writing on the disk, the read/write head being controlled by a time-domain based controller that provides closed-loop feedback control to an actuator for moving the read/write head, the servo pattern being written on the disk by operating the controller to, in real time:
   measure read head position information of the read/write head on the disk;
   provide the measured read head position information to a state observer which produces feedback variables for feedback control of the read/write head, the feedback variables being weighted by feedback gains which have been determined a priori; and
   apply the weighted feedback variables to provide the closed-loop feedback control to the actuator for moving the read/write head;

wherein the feedback gains of the feedback variables for stable feedback control of the read/write head are provided in a lookup table.

14. The disk drive of claim 13 wherein the state observer comprises a Kalman filter.

15. The disk drive of claim 13 wherein the feedback gains of the feedback variables are determined a priori by calculating the closed-loop eigenvalues of the controller to provide closed-loop feedback control to the actuator and multiplying the eigenvalues by a scale factor to reduce a number of nonzero feedback gains to twice the number of states in the actuator and actuator controls.

16. The disk drive of claim 15 wherein the number of nonzero feedback gains is smaller than about 50.

17. The disk drive of claim 13 wherein the feedback gains of the feedback variables to achieve a preset desired performance are provided in a lookup table.

18. The disk drive of claim 17 wherein the feedback gains are determined a priori by applying an optimal linear quadratic control design to produce improved or low track squeeze, or improved TMR (Track Mis-Registration).

* * * * *